Jan. 29, 1924.
R. J. ZANONE
1,482,058
WEIGHING DEVICE
Filed March 20, 1922  4 Sheets-Sheet 1
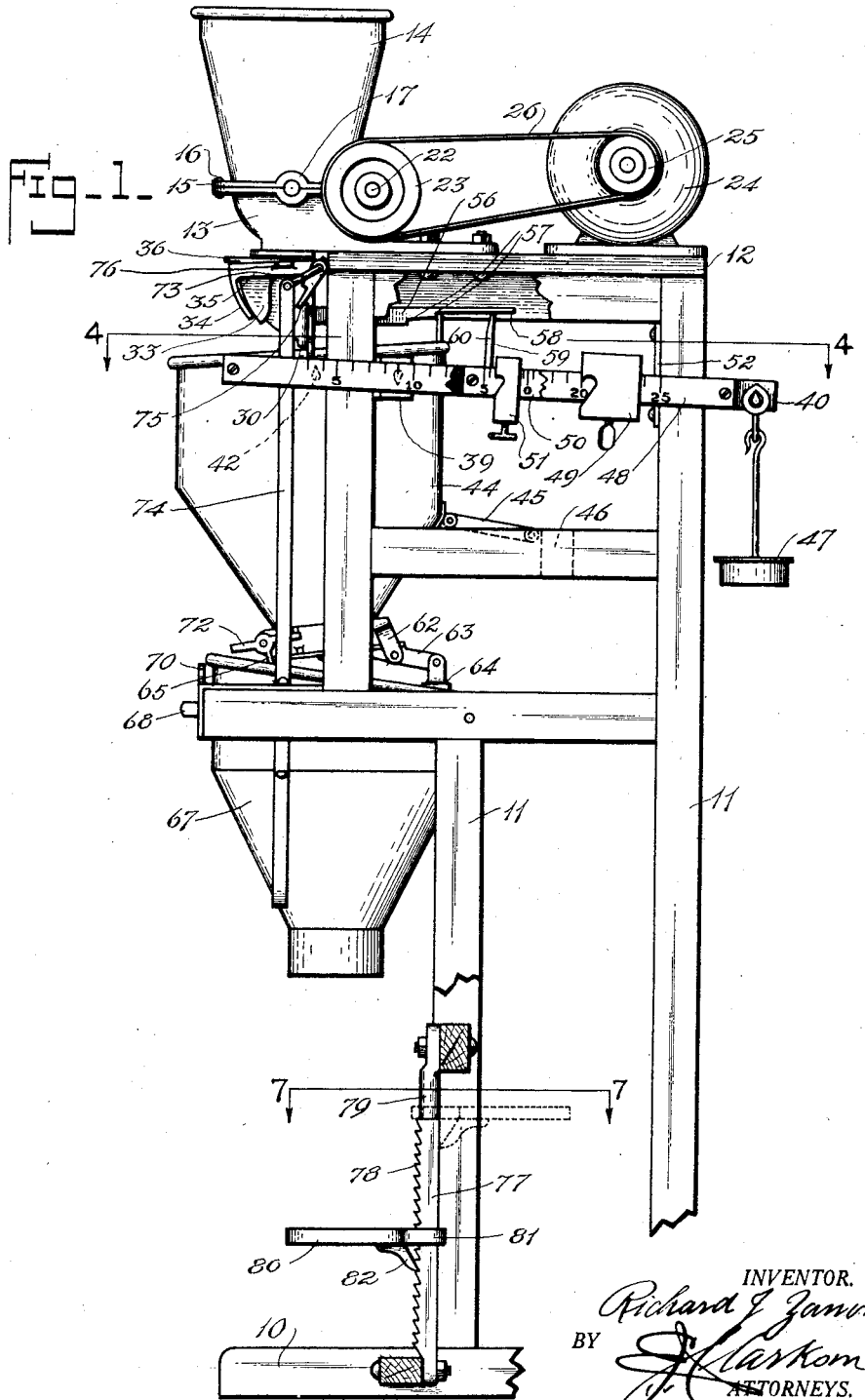
INVENTOR.
Richard J. Zanone
BY
Clarkson
ATTORNEYS.

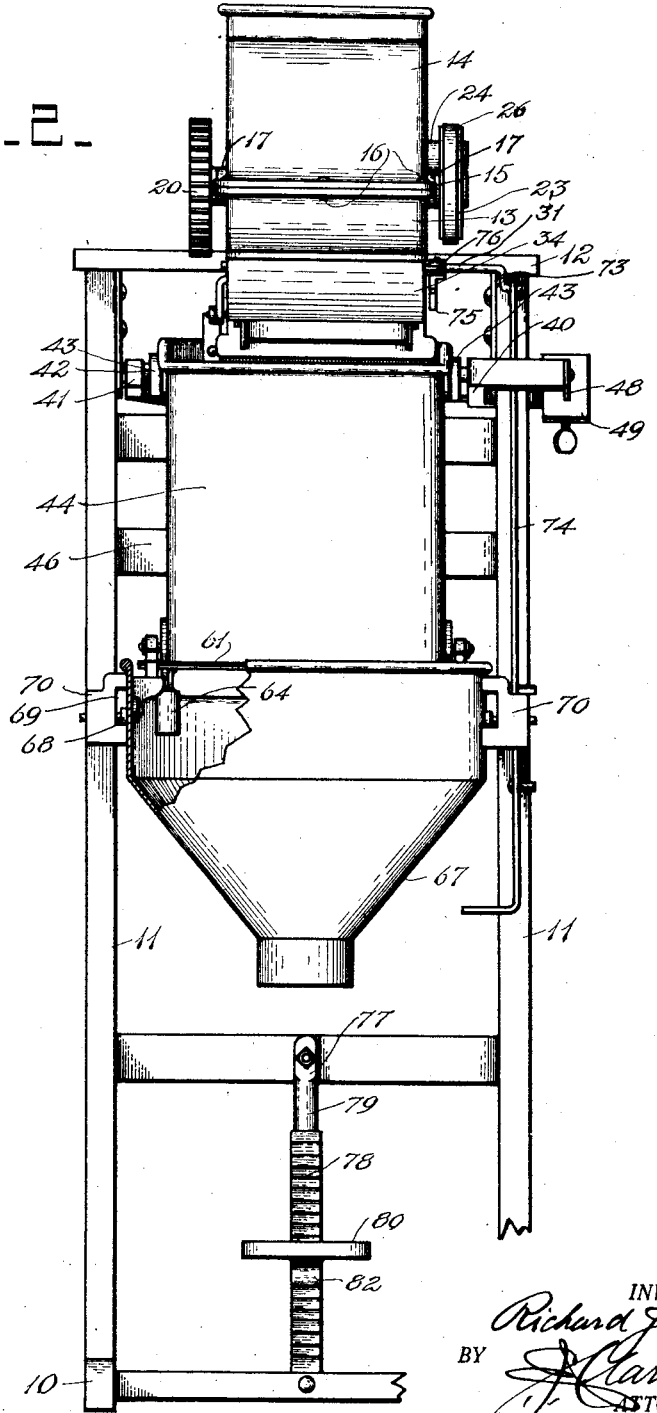

Jan. 29, 1924.
R. J. ZANONE
1,482,058
WEIGHING DEVICE
Filed March 20, 1922
4 Sheets-Sheet 3
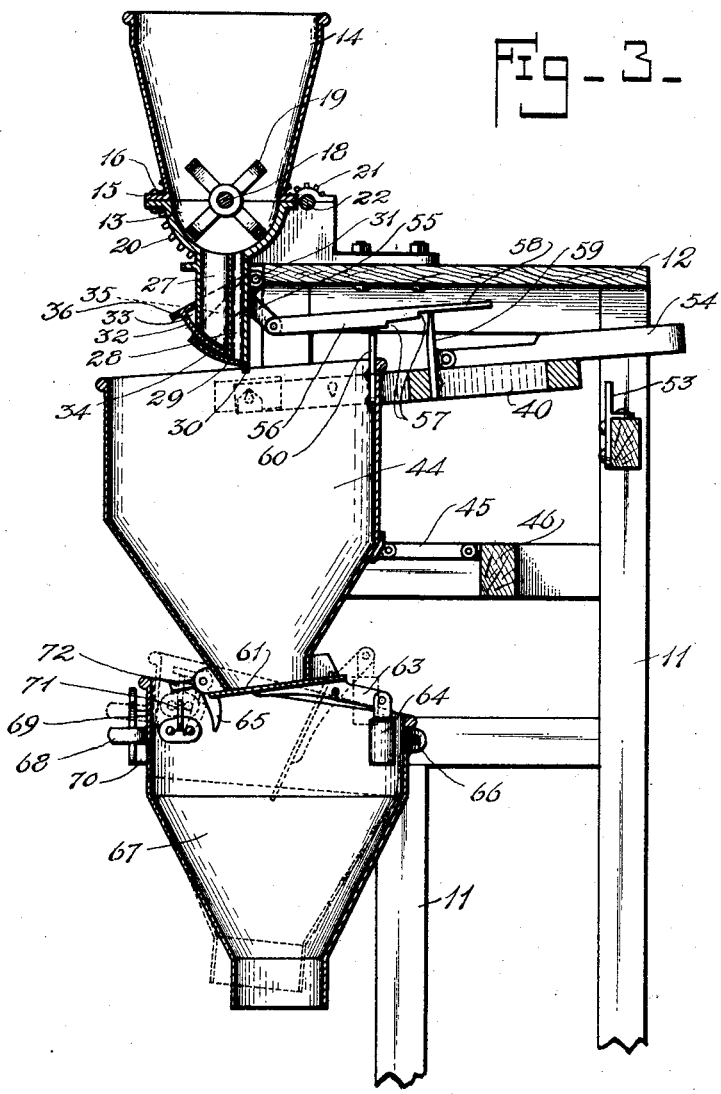
Fig-3-
INVENTOR.
Richard J Zanone
BY
ATTORNEYS.

Jan. 29, 1924.
R. J. ZANONE
1,482,058
WEIGHING DEVICE
Filed March 20, 1922     4 Sheets-Sheet 4
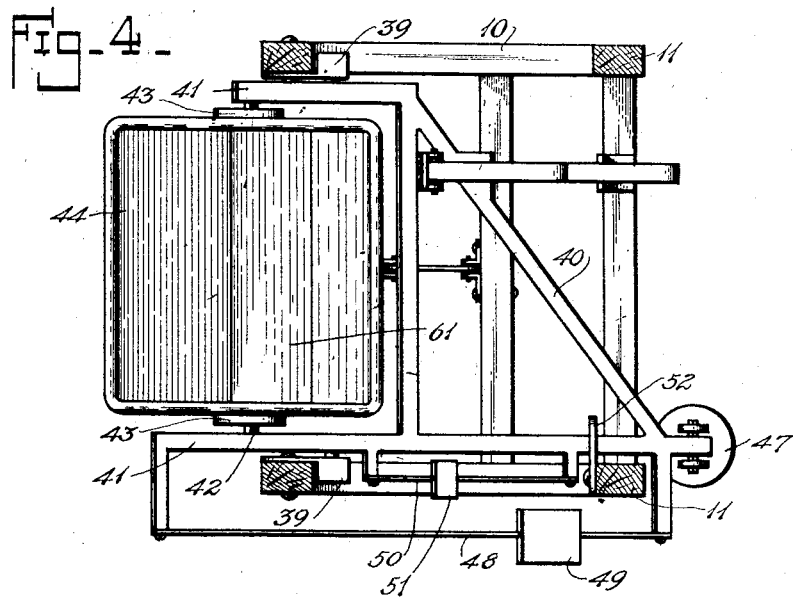
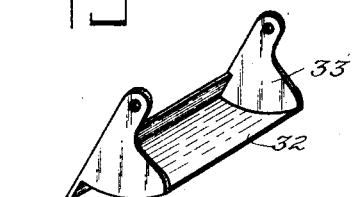
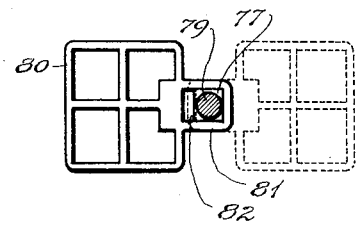
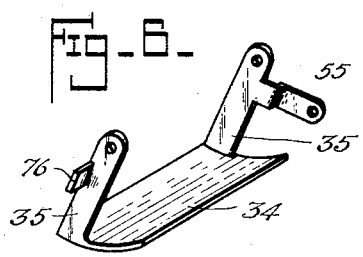
INVENTOR.
Richard J. Zanone
BY
*[signature]*
ATTORNEYS.

Patented Jan. 29, 1924.

1,482,058

UNITED STATES PATENT OFFICE.

RICHARD J. ZANONE, OF LOUISVILLE, KENTUCKY, ASSIGNOR TO VOGT-ZANONE SCALES COMPANY, OF LOUISVILLE, KENTUCKY, A CORPORATION OF KENTUCKY.

WEIGHING DEVICE.

Application filed March 20, 1922. Serial No. 545,168.

*To all whom it may concern:*

Be it known that RICHARD J. ZANONE, citizen of the United States, residing at Louisville, in the county of Jefferson and State of Kentucky, has invented certain new and useful Improvements in Weighing Devices, of which the following is a specification.

This invention relates to scales such as are used for weighing commodities in bulk, as for instance, sugar, grain, coffee and the like. More particularly the invention relates to an automatic weighing scale wherein predetermined weights of the required commodities may be accurately weighed and delivered, as for instance into bags, or the like.

It is common to provide weighing scales with a storage hopper having a valve controlled outlet from which the commodity is delivered into a weighing hopper and in such scales provision is frequently made for cutting off the outlet passage when the required amount has passed into the weighing hopper. The usual construction in such cases is found to be inaccurate because the size of the delivery outlet is ordinarily such that an appreciable quantity of material will pass into the weighing hopper before the valve controlling the outlet closes. In some it has been thought to overcome this objection by making the outlet much narrower than usual. This introduces a second serious objection which is that much time is lost in the filling of the hopper and there is a tendency of the outlet to clog especially where damp materials are dispensed such as brown sugar.

One important object of the present invention is to provide an improved form of automatic weighing scale wherein the delivery of material from the storage hopper to the weighing hopper is so controlled, by improved means, that the flow of the material is rapid enough at first to quickly fill the weighing hopper with nearly the quantity of material desired after which the flow is cut down so that the balance of the material to be weighed flows slowly into the weighing hopper until the required amount is reached at which time the flow is completely cut off.

A second important object of the present invention is to provide an improved means for supporting the bottom of the bag or sack into which the commodity is to be delivered, such means being arranged for adjustment to various heights and to be swung entirely out of the way whenever desired.

A third important object of the invention is the provision of an improved arrangement of delivery funnel and weighing hopper door or gate wherein a simple rocking movement of the delivery funnel serves to trip a gate latch and permit the gate to open.

With the above and other objects in view, the invention consists in general of certain novel details of construction and combinations of parts hereinafter fully described, illustrated in the accompanying drawings, and specifically claimed.

In the accompanying drawings, like characters of reference indicate like parts in the several views, and:—

Figure 1 is a side elevation of the improved scale, certain of the parts being broken away and others shown in section the better to disclose the construction.

Figure 2 is a view similar to Figure 1 but taken from the front of the scale.

Figure 3 is a vertical section of the device on a plane at right angles to Figure 2.

Figure 4 is a section on the line 4—4 of Figure 1.

Figure 5 is a detail perspective view of what is termed the inner gate.

Figure 6 is a detail perspective view of what is termed the outer gate.

Figure 7 is a section on the line 7—7 of Figure 1.

In the embodiment of the invention as illustrated in the accompanying drawing there is provided a base 10 which supports a frame 11 having a platform 12 on its top. Mounted on the platform 12 at the front thereof is a storage hopper for receiving the commodity to be weighed and delivered. This hopper consists of a lower portion 13 and an upper portion 14 having opposed flanges 15 connected by rivets 16. On opposite sides of the hopper these flanges are arranged to form alined bearings 17 which serve to support a shaft 18 carrying the agitator arms 19. On one end of this shaft is fixed a gear 20 wherewith meshes a pinion 21 fixed on a shaft 22 journalled in the lower part 13 and carrying a belt wheel 23. At 24 is a motor provided with the usual belt pulley 25 which is connected to the belt wheel 23 by means of a belt 26.

Thus operation of the motor causes rotative movement of the agitator arms and it is to be noticed that the bottom of the hopper is shaped internally to conform to the shape and path of the agitator arms. Leading from the bottom of the storage hopper is a double tube having a front passage 27 and a rear passage 28. The mouth of the passage 27 is cut away arcuately and the same is true of the mouth of the passage 28, but the radius on which the latter is cut, while having the same center is of greater length. Consequently the wall between the two passages projects downward as at 29 below the mouth of the passage 27. Also the back wall of the double tube projects below the mouth of the passage 28 as shown at 30.

Suitably supported at the rear of the delivery tubes is a rock shaft 31. At 32 is an arcuate gate for closing the lower end of the passage 27. This gate is preferably termed the inner gate and has side arms 33 wherethrough the shaft 31 passes, the gate swinging freely on said shaft. The length of these arms is such that the gate fits snugly beneath the mouth of the passage 27, and, when closed, its rear edge engages the projection 29 which thus constitutes a stop for limiting movement of the gate in one direction. At 34 is a second arcuate gate which is located outside of the gate 32 and thus constitutes an outer gate. This gate is also provided with side arms which are shown at 35 and by means of which the gate swings freely on the shaft 31. From an inspection of Figure 3 it will be seen that movement of the gate 34 forwardly and upwardly will cause the front edge of said gate to engage a flange 36 which is formed on the front edge of the gate 32. When thus engaged it is obvious that further movement in the same direction of the gate 34 will carry with it the gate 32. It will now be plain that this movement of the gate 34 effects opening of the passages 28 and 27 in the order named and that reverse movement from the open position will close said passages in the reverse order.

Fulcrumed on suitable bearing plates 39 is a tilting frame 40 having forwardly projecting arms 41 carrying the fulcra 42 which engage beneath bearing plates 43 on the sides of a weighing hopper 44. This hopper is located beneath the outlet tubes and is held against undue oscillation by means of a link 45 pivoted at one end to the hopper and at its other end to a transverse main frame member 46. The tilting frame 40 is provided with a counter poise 47 to balance the weight of the hopper and also carries a main scale beam 48 on which is a sliding poise 49 and a supplemental scale beam 50 provided with a sliding poise 51. By means of the main poise 49 the coarser units of weight may be allowed for while the supplemental poise 51 is utilized for the minor units or slight variations. A limit stop 52 is mounted on the main frame to prevent excessive movement thereof and there is also provided on this frame a stop 53 which is so positioned as to engage and lift the rear end of a weight bar 54 having its front end pivoted to the tilting frame 40. Thus when the tilting frame moves to the position which it assumes when the hopper 44 is empty the weight 54 causes such motion to take place rapidly at first until the weight strikes the stop 53 whereupon it is raised from the frame 40 and the latter comes quietly to rest without undue shock or jar.

Extending from one of the arms 35 is an arm 55 whereto is pivoted the forward end of a rack bar 56 provided with a pair of stepped teeth 57 and an extended rear end 58. Fixed to the frame 40 is a supporting finger 59 which prevents the rear end 58 from dropping too far. Fixed to the rear wall of the hopper 44 is a finger 60 which constitutes a pawl member for engaging the ratchet teeth 57. It will now be observed from inspection of Figure 1 that forward movement of the ratchet bar 56 raises the gate 34 to such position that both of the passages 27 and 28 are open. The hopper 44 being empty occupies its uppermost position at this particular time and when in such position the pawl 60 engages the rear tooth 57. Assuming that the bottom of the hopper 44 is closed and that the commodity to be weighed is in the hopper 14 it will be plain that flow of such commodity through the passages 27 and 28 will now take place. This will continue until sufficient of such commodity has passed into the weighing hopper to cause the latter to move downward, the tilting frame 40 obviously tilting at this time. As the hopper 44 moves downward the pawl 60 disengages from the rear tooth 57 whereupon the weight of the two gates forces the ratchet bar 56 backward until the front tooth 57 engages against the pawl 60. At this time the inner gate will be closed and the outer gate opened. The commodity will continue to flow through the narrow passage 28 but of course in greatly reduced quantity, the tilting of the frame 40 being momentarily checked by reason of the fact that at this instant when the finger 60 disengages from the rear tooth 57 the frame has tilted to such a degree that the weight 54 is brought on the rear of said frame, being lifted just clear of the stop 53. The commodity will continue through the passage 28 until the frame tilts a second time whereupon the pawl 60 will disengage from the front tooth 57 and the parts will assume the position shown in full lines in Figure 3, the outer gate 34 closing the passage 28 so that further flow of the commodity is cut off.

The bottom of the hopper 44 is normally closed by a door 61 which is pivoted to arms 62 at the rear of said hopper, the door being provided with rearwardly extending arms 63 from which hangs counterweight 64 of sufficient mass to close the door whenever the hopper is empty. At the front of the bottom of the hopper 44 is pivotally mounted a latch member 65 which engages the front edge of the door 61 when the latter is closed and holds it in closed position until such latch member is moved to free the door.

Pivoted to the main frame at 66 is a delivery funnel 67 which has projecting from its front portion a finger 68 movable vertically in a slot 69 formed in a plate 70. Preferably there is one of these fingers and its accompanying plate on each side of the hopper. On the forward portion of the hopper 67 there is provided a finger 71 which is positioned to engage an arm 72 projecting forwardly from the latch 65. These parts are so arranged that whenever the hopper 44 is fully depressed by the weight of the material therein and the hopper 67 tilted from the full line to the dotted line position in Figure 3 the finger 71 engages the finger 72, trips the latch 65 and releases the door 61 which, under the influence of the weight of the commodity in the hopper 44, opens as shown in dotted line and drops such commodity out of the weighing hopper 44 thus permitting the same to rise.

In order to avoid the necessity for manually operating the ratchet bar 56 there is provided on the shaft 31 a rock arm 73 which is connected with the upper end of a push rod 74 having its lower end adjacent the funnel 67. Also on the rock shaft 31 is a rocker 75 which is engageable with a lug 76 on one of the arms 35. By this means upward movement of the rod 74 opens the gates of the feed hopper and thus draws the ratchet bar forwardly until the pawl engages behind the rear tube of such bar.

At the lower end of the frame 11 there is mounted a vertical bar 77 having upwardly directed serrations 78 on its forward face. The upper end of this bar is circular in cross section as shown at 79 while the parts below are rectangular in cross section. At 80 is a bag supporting platform having at one end an extension 81 provided with a rectangular opening thereto which is of substantially the same width as the bar 77 but is slightly longer than the depth of said bar from front to back. Beneath the shelf 80 and formed integrally therewith is a tooth 82 which engages selectively with the serrations 78. By lifting up on the plate 80 it may be moved either upwardly or downwardly until the desired height has been reached. When such height has been reached the plate 80 can be moved to horizontal position whereupon the tooth 82 will engage in one of the serrations and lock said plate from further downward movement. Thus adjustment can be effected for any desired size of bag. When it is desired to get this plate entirely out of the way it may be moved upward to the circular portion of the bar 77 whereupon it may be swung around to dotted line position as shown in Figure 1.

There has thus been provided a simple and efficient device of the kind described and for the purposes specified.

It is obvious that minor changes may be made in the form and construction of the invention without departing from the material principles thereof. It is not therefore desired to confine the invention to the exact form therein shown and described but it is wished to include all such as properly come within the scope claimed.

Having thus described the invention, what is claimed as new, is:—

1. In a weighing machine, a storage hopper having a pair of outlet passages, a weighing hopper mounted to move downwardly under the influence of weight therein and positioned below said passages, a pair of gates each controlling a respective passage, a toothed ratchet operatively connected to said gates to hold them open, and a pawl member on the weighing hopper positioned to release one and engage the next tooth of said ratchet as the weighing hopper moves downward.

2. In a weighing machine, a storage hopper provided with a pair of depending tubular outlets, terminating in arcuately cut off mouths at different elevations, concentric gates swinging from a common axis and closing respective mouths, means on the inner gate engageable by the outer gate upon the latter reaching fully opened position and arranged to move the inner gate open upon further movement of the outer gate, and releasable means for holding the outer gate raised to a position wherein the inner gate is fully opened.

3. In a weighing machine, a storage hopper provided with a pair of depending tubular outlets, terminating in arcuately cut off mouths at different elevations, concentric gates swinging from a common axis and closing respective mouths, means on the inner gate engageable by the outer gate upon the latter reaching fully opened position and arranged to move the inner gate open upon further movement of the outer gate, a weighing hopper mounted for downward movement under the influence of weight of material therein and into which said outlets open a pawl carried by said hopper, and a ratchet bar connected to the outer gate and having stepped teeth successively engageable by said pawl, the pawl being released from the teeth successively by downward movement of the hopper, said ratchet bar and pawl being arranged to hold both gates open.

4. In a weighing machine, a storage hopper provided with a pair of depending tubular outlets, terminating in arcuately cut off mouths at different elevations, concentric gates swinging from a common axis and closing respective mouths, means on the inner gate engageable by the outer gate upon the latter reaching fully opened position and arranged to move the inner gate open upon further movement of the outer gate, a tilting frame, a weighing hopper mounted on one end of said frame for downward movement under the influence of weight of material therein and into which said outlets open, means to impose a weight on the other end of said tilting frame at a predetermined point in the downward movement of the weighing hopper, a pawl carried by said hopper, and a ratchet bar connected to the outer gate and having stepped teeth successively engageable by said pawl, the pawl being released from the teeth successively by downward movement of the hopper, said ratchet bar and pawl being arranged to hold both gates open releasably.

5. In a weighing machine, a vertically movable weighing hopper having an opening in its lower end, a gate hinged at one side of said opening for closing the same, a latch engaging the free edge of said gate for holding the same closed, said latch pivotally mounted on the hopper, a tiltable delivery funnel pivoted at one side and positioned beneath said gate, and a finger carried by said funnel, said latch and finger being so positioned that the finger engages the latch whenever the hopper is at the bottom of its movement and the funnel is tilted upwardly.

6. In a weighing machine, a storage hopper provided with a pair of outlets having mouths at different elevations, concentric gates swinging about a common axis, and moving different distances to close the respective mouths, and means controlled by a weighing hopper to release said gates for successive closing movement, each of said gates closing a respective outlet only.

7. In a weighing machine, a vertically movable weighing hopper having an opening in its lower end, a gate for closing said opening, a latch engaging said gate for holding it closed, a tiltable delivery funnel beneath the gate, and means carried by said funnel and releasing the latch when the hopper is at the bottom of its movement.

8. In a weighing machine, a vertically movable weighing hopper having an opening in its lower end, means for closing the opening, a releasable means for holding said closing means in operative position, a tiltable delivery funnel located beneath the hopper, and means carried by said funnel and releasing the holding means whenever the hopper reaches the bottom of its movement.

In testimony whereof I affix my signature.

RICHARD J. ZANONE.